(12) United States Patent
Brandin

(10) Patent No.: US 10,435,022 B2
(45) Date of Patent: Oct. 8, 2019

(54) ADAPTIVE CRUISE CONTROL SYSTEM AND VEHICLE COMPRISING AN ADAPTIVE CRUISE CONTROL SYSTEM

(71) Applicant: Volvo Car Corporation, Gothenburg (SE)

(72) Inventor: Magnus Brandin, Molnlycke (SE)

(73) Assignee: Volvo Car Corporation, Gothenburg (SE)

( * ) Notice: Subject to any disclaimer, the term of this patent is extended or adjusted under 35 U.S.C. 154(b) by 167 days.

(21) Appl. No.: 15/499,311

(22) Filed: Apr. 27, 2017

(65) Prior Publication Data

US 2017/0349174 A1   Dec. 7, 2017

(30) Foreign Application Priority Data

Jun. 7, 2016   (EP) .................................... 16173340

(51) Int. Cl.
*B60W 30/14*       (2006.01)
*B60K 31/00*       (2006.01)
(Continued)

(52) U.S. Cl.
CPC ....... *B60W 30/143* (2013.01); *B60K 31/0008* (2013.01); *B60K 35/00* (2013.01);
(Continued)

(58) Field of Classification Search
CPC .... B60W 30/143; B60W 30/16; B60W 10/04; B60W 10/06; B60W 10/18; B60W 50/08; B60W 2050/146; B60W 2510/205; B60W 2540/04; B60W 2540/18; B60W 2710/18; B60W 2720/10; B60W 2750/302; B60K 31/0008; B60K 35/00; B60K 2031/0016; B60K 2031/0033; B60R 1/00; B62D 15/021; B60Y 2400/3015; B60Y 2400/3017; G01S 13/931; G01S 17/936; G01S 2013/9321

See application file for complete search history.

(56) References Cited

U.S. PATENT DOCUMENTS

| 7,272,482 B2 * | 9/2007 | Kubota | ............. B60K 31/0008 340/436 |
| 7,373,237 B2 * | 5/2008 | Wagner | ............. B60K 31/0008 340/435 |

(Continued)

FOREIGN PATENT DOCUMENTS

DE      102006059353 A1    6/2008

*Primary Examiner* — Thomas E Worden
(74) *Attorney, Agent, or Firm* — Snyder, Clark, Lesch & Chung, LLP

(57) ABSTRACT

A vehicle and an adaptive cruise control system (ACC) is provided. The ACC comprises a steering wheel system with a steering wheel arranged to allow the provision of manual steering input to the steering system of the vehicle and a steering angle sensor, wherein the steering system is configured to identify a specific momentary manual steering wheel actuation by comparing data from the steering angle sensor with predetermined thresholds, and to select a next one of the moving or stationary objects in the surroundings in front of said vehicle to control the speed of said vehicle in relation to, based on the direction of the specific momentary manual steering wheel actuation indicated by the steering angle sensor.

15 Claims, 2 Drawing Sheets

(51) Int. Cl.

| | | |
|---|---|---|
| *B60K 35/00* | (2006.01) | |
| *B60R 1/00* | (2006.01) | |
| *B60W 10/04* | (2006.01) | |
| *B60W 10/06* | (2006.01) | |
| *B60W 10/18* | (2012.01) | |
| *B60W 30/16* | (2012.01) | |
| *B62D 15/02* | (2006.01) | |
| *B60W 50/08* | (2012.01) | |
| *B60W 50/14* | (2012.01) | |
| *G01S 13/93* | (2006.01) | |
| *G01S 17/93* | (2006.01) | |

(52) U.S. Cl.
CPC ............... *B60R 1/00* (2013.01); *B60W 10/04* (2013.01); *B60W 10/06* (2013.01); *B60W 10/18* (2013.01); *B60W 30/16* (2013.01); *B62D 15/021* (2013.01); *B60K 2031/0016* (2013.01); *B60K 2031/0033* (2013.01); *B60W 50/08* (2013.01); *B60W 2050/146* (2013.01); *B60W 2510/205* (2013.01); *B60W 2540/04* (2013.01); *B60W 2540/18* (2013.01); *B60W 2710/18* (2013.01); *B60W 2720/10* (2013.01); *B60W 2750/302* (2013.01); *B60Y 2400/3015* (2013.01); *B60Y 2400/3017* (2013.01); *G01S 13/931* (2013.01); *G01S 17/936* (2013.01); *G01S 2013/9321* (2013.01)

(56) References Cited

U.S. PATENT DOCUMENTS

| | | | | |
|---|---|---|---|---|
| 8,718,919 | B2 * | 5/2014 | Leineweber | G08G 1/163 |
| | | | | 180/167 |
| 8,909,428 | B1 * | 12/2014 | Lombrozo | B62D 15/025 |
| | | | | 701/41 |
| 10,137,871 | B2 * | 11/2018 | Lesher | B60W 10/18 |
| 2001/0014846 | A1 * | 8/2001 | Sawamoto | B60K 31/0008 |
| | | | | 701/96 |
| 2012/0253628 | A1 * | 10/2012 | Maruyama | B60W 50/085 |
| | | | | 701/93 |
| 2014/0100756 | A1 * | 4/2014 | Schwindt | F02D 28/00 |
| | | | | 701/96 |
| 2014/0249722 | A1 * | 9/2014 | Hegemann | G08G 1/16 |
| | | | | 701/41 |
| 2015/0134204 | A1 * | 5/2015 | Kunihiro | B62D 15/025 |
| | | | | 701/41 |
| 2016/0001776 | A1 * | 1/2016 | Kim | B60W 10/06 |
| | | | | 701/96 |
| 2017/0349175 | A1 * | 12/2017 | Brandin | B60Q 1/34 |

* cited by examiner

ADAPTIVE CRUISE CONTROL SYSTEM AND VEHICLE COMPRISING AN ADAPTIVE CRUISE CONTROL SYSTEM

RELATED APPLICATION

This application claims priority under 35 U.S.C. § 119 based on European Patent Application No. 16173340.7, filed Jun. 7, 2016, the disclosure of which is hereby incorporated by reference herein.

TECHNICAL FIELD

Embodiments herein relate to an adaptive cruise control system. Embodiments herein further relate to a vehicle comprising an adaptive cruise control system.

BACKGROUND

Some vehicles today are equipped with autonomous and/or at least partly automatic drive systems. Such systems generally aim at increasing comfort and/or safety for vehicle occupants. Some systems are also arranged to increase safety for persons in the host vehicle and/or its surrounding.

An example of such system is an adaptive cruise control system, ACC. The ACC may comprise one or more sensors, such as a camera and/or a radar, which continuously monitors the host vehicle surrounding. The ACC may also comprise or be connected to a drive control system which adjust a velocity of the host vehicle in dependence to a vehicle in front of the host vehicle as detected by the sensors. If the host vehicle approaches a preceding vehicle driving in the same lane the ACC may adjust the selected velocity such that the host vehicle keeps a safety distance to the preceding vehicle and follows the preceding vehicle at the safety distance. An ACC can also keep a selected host vehicle velocity where no vehicles are present in front of the host vehicle.

An ACC may thus perform some drive related functions and can therefore relieve the vehicle operator from some specific tasks, such as controlling a host vehicle velocity in some situations. It would however be desirable with an ACC which, at least partly, can control the host vehicle in a larger number of traffic scenarios and situations than possible today. Accordingly, improvements in the field of adaptive cruise controls and functions thereof are still desirable.

SUMMARY

Embodiments herein aim to provide an adaptive cruise control system capable of assisting a vehicle operator in various traffic scenarios.

According to an embodiment, this is provided by an adaptive cruise control system for controlling speed of a vehicle in relation to moving or stationary objects by accelerating or retarding the vehicle, said system comprising; a vehicle throttle controller, a vehicle braking system controller, at least one object detection sensor arranged to detect moving or stationary objects in the surroundings in front of said vehicle, and a control unit configured to control the speed of said vehicle in relation to a selected one of the detected moving or stationary objects by controlling the throttle controller and the vehicle braking system controller. The adaptive cruise control system further comprises; a steering system with a steering wheel arranged to allow the provision of manual steering input to the steering system of the vehicle and a steering angle sensor, wherein the steering system is configured to identify a specific momentary manual steering wheel actuation by comparing data from a steering angle sensor with predetermined thresholds, and to select a next one of the moving or stationary objects in the surroundings in front of said vehicle to control the speed of said vehicle in relation to, based on the direction of the specific momentary manual steering wheel actuation indicated by the steering angle sensor.

Since the steering system is configured to identify a specific momentary manual steering wheel actuation and to select a next one of the moving or stationary objects in the surroundings in front of said vehicle based on the direction of the specific momentary manual steering wheel actuation indicated by the steering angle sensor, a vehicle operator is allowed to select objects which the host vehicle should control the speed in relation to.

Hereby, the vehicle operator can turn or jerk the steering wheel to set "targets" for the ACC and the ACC will provide enhanced functionality since it can control the vehicle in a number of new situations. Accordingly, the adaptive cruise control system is capable of assisting a vehicle operator in various traffic scenarios where a prior art ACC would be disabled or would not assist the vehicle operator with automatic or semi-automatic drive functions.

According to some embodiments as a default a moving or stationary object in the surroundings essentially right in front of said vehicle is used to control the speed of said vehicle in relation to and a laterally next one of the moving or stationary objects in the surroundings in front of said vehicle is selectable by the specific momentary manual steering wheel actuation. Hereby the ACC will provide automatic or semi-automatic drive functions e.g. in a situation where the vehicle operator shall switch lane for the host vehicle. For example, if the host vehicle is driven in a right lane and is overtaken by a surrounding vehicle which passes the host vehicle on the left side, the vehicle operator may trigger the ACC to adjust the host vehicle velocity to a velocity of the vehicle in the left lane by turning the steering wheel slightly counter-clockwise. This steering wheel turning may be seen as the vehicle operator "points" towards the target with the steering wheel.

According to some embodiments the specific momentary manual steering wheel actuation is identifiable by the predetermined threshold of a steering angle of at least a degrees. Hereby suitable limits or thresholds can be set for when a new target for the ACC should be selectable. In some embodiments a steering wheel turn exceeding an angle α of 1-5 degrees is necessary for selection of a new target. In some embodiments a is about 1 degree, 2 degrees or 3 degrees. If the steering wheel is turned less than the threshold steering angle no new target is selected. The steering wheel actuation may have a maximum duration of about 0.2-0.5 seconds, or a maximum duration not exceeding 1 second. In some embodiments a longer duration is possible.

According to some embodiments the specific momentary manual steering wheel actuation is identifiable by the predetermined threshold of a change in steering angle of at least 10 degrees/second. Hereby suitable limits or thresholds can be set for when a new target for the ACC should be selectable. In some embodiments a steering wheel turn exceeding e.g. 10-20 degrees/second is necessary for selection of a new target.

According to some embodiments the specific momentary manual steering wheel actuation is identifiable by the predetermined threshold of a change in steering angle of at least 50 degrees/second. Hereby suitable limits or thresholds can be set for when a new target for the ACC should be selectable. In some embodiments an acceleration of a steering wheel turn exceeding e.g. 50-100, such as about 70-80 degrees/second$^2$ is necessary for selection of a new target.

According to some embodiments the specific momentary manual steering wheel actuation is identifiable by two different predetermined thresholds. The threshold values can have inverted values, i.e. a first threshold can be +α and a second threshold can be −α.

For example, a steering wheel actuation 1-3 degrees counter-clockwise follow by a steering wheel actuation 1-3 degrees clockwise, where both actuations are performed within a maximum time duration of 0.5-1 second triggers the ACC to select a new target. After the actuations the steering wheel is back in substantially the same position as before the actuations.

According to some embodiments the adaptive cruise control system further comprises a display arrangement, arranged to display a representation of the selected object, and an input arrangement, arranged to allow input of a confirmation of the displayed representation of the selected object being the object intended to be selected. The display arrangement can facilitate selection and/or confirmation of new targets for the ACC.

Embodiments herein also aim to provide a vehicle comprising an adaptive cruise control system capable of assisting a vehicle operator in various traffic scenarios. According to some embodiments, this is provided by a vehicle comprising an adaptive cruise control system according to embodiments disclosed herein.

BRIEF DESCRIPTION OF THE DRAWINGS

The various aspects of embodiments herein, including its particular features and advantages, will be readily understood from the following detailed description and the accompanying drawings, in which.

DETAILED DESCRIPTION

Embodiments herein will now be described more fully with reference to the accompanying drawings, in which some embodiments are shown. Like numbers refer to like elements throughout and well-known functions or constructions will not necessarily be described in detail for brevity and/or clarity.

Figure 1:
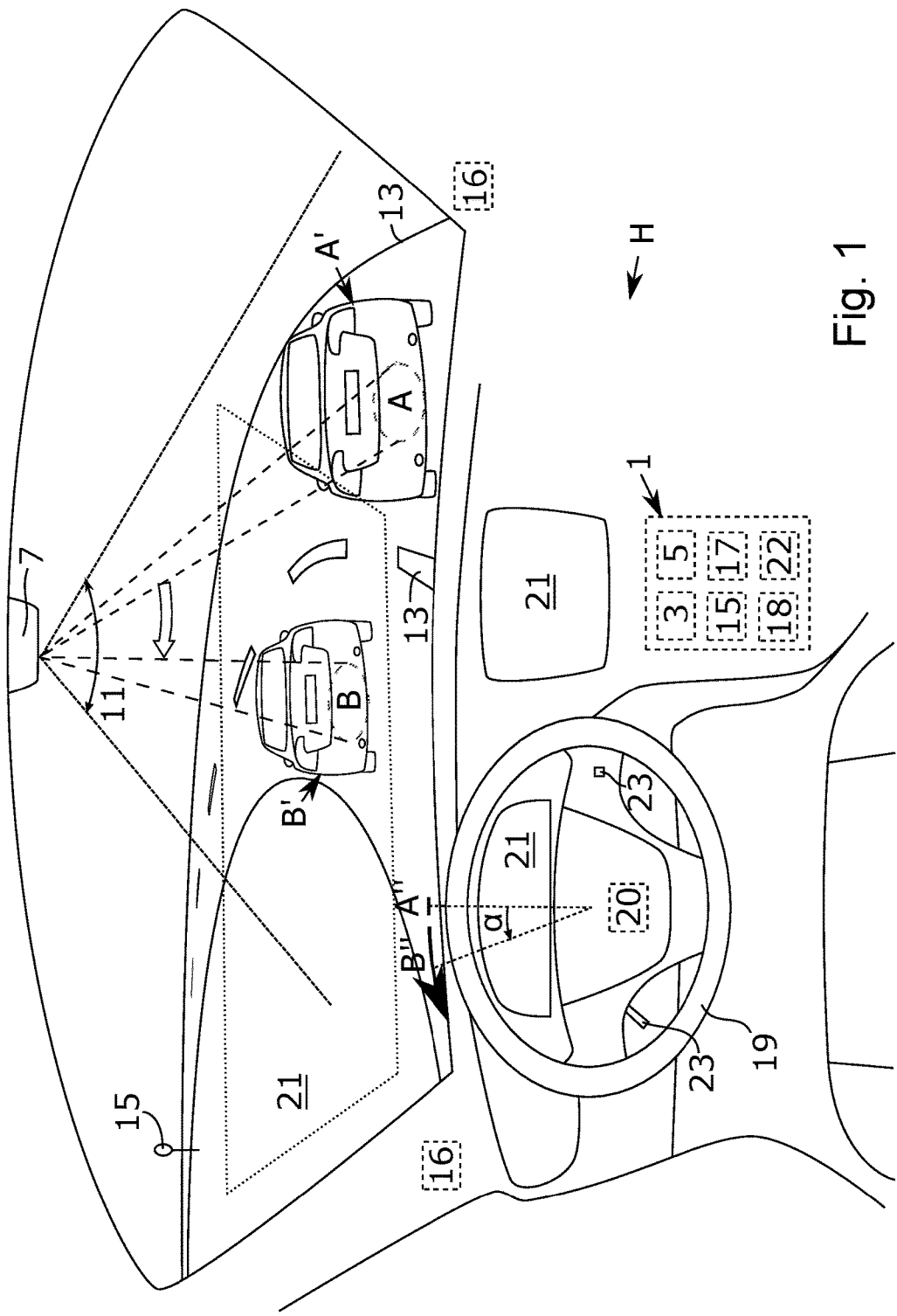
FIG. 1 illustrates a vehicle and an adaptive cruise control system according to some embodiments in a traffic scenario.

FIG. 1 illustrates an adaptive cruise control system, ACC 1. The ACC is arranged to provide semi-automatic drive functionality to a host vehicle H in which the ACC 1 is arranged.

The ACC 1 is arranged to control e.g. speed of the vehicle H in relation to moving or stationary objects by accelerating or retarding the vehicle H. The ACC 1 comprises or is connected to a vehicle throttle controller 3 and a vehicle braking system controller 5. The ACC 1 can be connected to a host vehicle engine and a host vehicle braking system, such that the ACC 1, directly or indirectly, can control acceleration and/or deceleration of the host vehicle H. The ACC 1 can e.g. increase a host vehicle velocity by increasing the engine speed, and decrease the host vehicle velocity by motor-braking or by activation of one or more wheel brakes. The ACC 1 may e.g. be connected to an ABS (anti-lock braking system), such that one or more wheel brakes can be activated selectively.

The ACC may optionally also provide some steering functionality to the host vehicle H. The host vehicle H or the ACC 1 can comprise an electrical/mechanical control arrangement, arranged to control steering and velocity of the host vehicle H at least partly based on information received from detection sensors, described below. The ACC 1 can comprise or be connected to a vehicle steering system, such that the ACC 1, directly or indirectly, can control a direction of at least some of the wheels of the host vehicle H. Hereby e.g. a yaw rate of the host vehicle H can be adjusted, such that the driving direction of the host vehicle H is adjusted in accordance with the input from the ACC 1. When the ACC 1 may control steering functions it may also be referred to as a pilot assist system or similar. It may then, at least in some velocity-ranges, detect road markings and steer the host vehicle H to follow said markings. The embodiments, including any features described herein, can be used for target selection in such pilot assist system or any similar vehicle systems for semi-automatic or semi-autonomous driving.

In some embodiments the ACC 1 comprises, or is connected to, a number of vehicle subsystems. Each such subsystem may provide some automatic- or semi-automatic drive functions. Examples of such subsystem are: lane departure warning and/or control systems, collision avoidance systems, auto-braking systems, traffic sign recognition systems, some communication systems, some navigation systems, ultrasonic sensor systems, infrared camera systems, inertial measuring systems, intelligent transportation systems, safe road train systems, automatic parking systems etc.

The ACC 1 further comprises or is connected to at least one object detection sensor 7 which is arranged to detect moving or stationary objects in the surroundings in front of the host vehicle H. Examples of such objects or targets are preceding vehicles A', B', illustrated in FIG. 1.

The object detections sensor or sensors 7 can be one or more camera sensors, one or more radar sensors and/or one or more lidar-sensors. The at least one sensor 7 can be arranged at any position in/on the host vehicle H from where detection of a vehicle surrounding is possible. Sensors 7 may for example be arranged at a vehicle front-, side and/or rear portion, at a vehicle grille, bumpers, rear-view-mirrors and/or a windshield. Some sensors 7 may be arranged in or near a vehicle compartment, chassis, motor, drivetrain and/or wheels. The sensor position may depend on the type of sensor used. For example, a camera sensor may be arranged at an inside of a windshield, while one or more radar sensors and/or a lidar sensor may be arranged in the grille and/or bumpers. In FIG. 1 a sensor monitoring field 11 is illustrated. The sensor monitoring field 11 may be directed in any direction and may cover parts of the host vehicle surrounding or the host vehicle surrounding in substantially all directions.

A camera sensor may be e.g. a front-, side- or rear facing digital camera equipped with or connected to one or more processors with object recognition logics. Hereby surrounding objects, such as road lanes 13, other vehicles A', B', traffic signs 15, pedestrians, animals, different obstacles etc. may be detected and in some cases, identified/classified. Radar sensors include transmitters that emit signals that bounce back from objects around the host vehicle H, and receivers that receive the returned signals. The radar sensors may include e.g. ultra wide band radars, narrow band radars and/or multi node radars. Lidar-sensors may measure distances to objects through illuminating the objects with a laser and analyzing the reflected light. Other types of sensors 7 used to monitor the vehicle surrounding may be e.g. ultrasonic sensors and/or infrared sensors.

The ACC 1 can comprise a control unit 15 configured to control the speed of the host vehicle H in relation to a selected one of the detected moving or stationary objects A', B' by controlling the throttle controller 3 and/or the vehicle braking system controller 5.

The ACC 1 further comprises; a steering system 17 with a steering wheel 19 arranged to allow the provision of manual steering input to the steering system 17 of the vehicle H. The control unit 15 and/or the steering system 17 and/or the ACC 1 may comprise any necessary processors with logic for the identification of the jerk/specific momentary manual steering wheel actuation and for comparing data from a steering angle sensor 18 with predetermined thresholds.

The steering system 17 is configured to identify a specific momentary manual steering wheel actuation by comparing data from the steering angle sensor 18 with predetermined thresholds. The steering angle sensor 18 can be any type of sensor configured to measure steering wheel position angle and rate/acceleration of steering wheel turn. The steering angle sensor 17 can for example be a digital steering position sensor which may be contactless. It may be a CAN Bus module steering angle sensor, an analogue steering angle sensor or a resetting steering angle sensor. The steering angle sensor 18 can for example be arranged in a sensor cluster in the steering column. Two or more sensors 18 can be used for redundancy and confirmation. The steering angle sensor 18 may also be arranged at any other steer- or gearing related parts. In some embodiments the steering angle sensor 18 is co-operating with or replaced by another type of sensor which is capable of detecting an adjustment of host vehicle yaw rate, host vehicle heading or similar and to provide information thereof to the steering system or ACC for the target control.

The steering system 17 is configured to select a next one of the moving or stationary objects A', B' in the surroundings in front of said vehicle H to control the speed of the host vehicle H in relation to based on the direction of the specific momentary manual steering wheel actuation indicated by the steering angle sensor.

In the scenario illustrated in FIG. 1 the ACC 1 of the host vehicle H is set to follow the preceding vehicle A'. The host vehicle H is overtaken by another vehicle B' which passes the host vehicle H and the preceding vehicle A' in an adjacent lane. If the driver of the host vehicle H decides that he/she would follow vehicle B' instead of vehicle A', he/she turns or jerk the steering wheel 19 from a neutral position A" to position B", at least a degrees from position A". This turning or jerk causes the target for the ACC to switch from A at vehicle A' to B at vehicle B'. In some embodiments the target switch is initiated after a steering wheel actuation from the neutral position A" to position B" and back to substantially the neutral position A" again. In some embodiments the A'-B" actuation or A"-B"-A" actuation within a time duration of 0.2-1 second, such as about 0.5 second, is necessary and sufficient for initiation of a target switch.

In some embodiments the target switch is initiated as a result of a steering wheel actuation of a threshold magnitude out from and back to a steering wheel neutral position within a threshold time duration. The steering wheel neutral position is a position in which the host vehicle is driven substantially straight ahead, without turning.

The threshold for the target switch may be e.g. 1-3 degrees. In some embodiments a target switch is activated by a steering wheel actuation of at least 10-20 degrees/second or at least 50-100, such as about 75, degrees/second. A jerk which should switch the target may be shorter than a predetermined time value such as less than 0.5 second. Hereby the ACC can differentiate between a steering wheel turn for target selection from a "normal" steering wheel turn for change of vehicle driving directions.

A jerk to the left/counter-clockwise indicates that a new target laterally to the left of the present target is selected, as illustrated in FIG. 1. A jerk to the right/clockwise indicates that a new target laterally to the right of the present target is selected.

The host vehicle H or the ACC may optionally comprise one or more display arrangements 21. Such display arrangement can for example be a head-up-display, HUD, or a display at a dashboard or centerstack of the host vehicle. The display arrangement 21 can be arranged to display a representation of the selected object A', B', The host vehicle H or the ACC may also comprise an input arrangement 22 with confirmation means, e.g. in form of a button or lever 23. The input arrangement 22 is arranged to allow input of a confirmation of the displayed representation of the selected object. Thus, when a vehicle operator turns the steering wheel 19 he/she can see a representation of the target A, B, e.g. in the form of an arrow, highlight or similar, and how a position/direction of the target is adjusted in dependence of the steering wheel actuation. He/she may then select or confirm target via the input arrangement 22 with the lever 23 or by pointing with a finger on a representation of the target directly on a display.

The input arrangement 22 can be connected to cameras and may comprise one or more processors with logic for recognition and/or classification of objects in the host vehicle surrounding. The ACC or the input arrangement may optionally suggest selectable targets based on target velocity, position etc. and a driver may confirm if such suggested target is to be selected or not.

Figure 2:
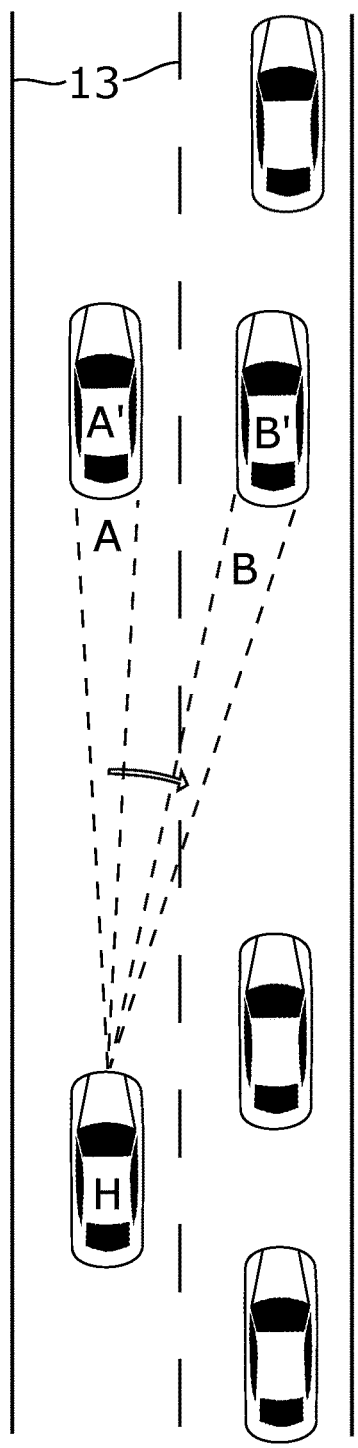
FIG. 2 illustrates a vehicle and an adaptive cruise control system according to some further embodiments in a traffic scenario.

FIG. 2 illustrates a scenario where the host vehicle H is driven on a road with road lanes 13. The host vehicle H comprises an ACC according to embodiments herein. The ACC is keeping a velocity which is selected by the host vehicle driver or is set to adjust the host vehicle velocity after the preceding vehicle A'. The host vehicle H is driven in a left lane and in a right lane are other vehicles driving.

If the host vehicle driver decides to switch lane to the right lane he/she can jerk the steering wheel some degrees clockwise. Such a "target selection jerk" may be at least a pre-determined number of degrees and may have a pre-determined maximum time duration.

Such a jerk will activate a switch of the target for the ACC, i.e. the object which the ACC is set to adjust the host vehicle velocity in relation to. In FIG. 2 the target switch is indicated by the change from target A to target B, i.e. from vehicle A' to vehicle B'.

In the embodiment illustrated in FIG. 2 the velocity of the host vehicle H will be decreased and adapted after the velocity of vehicle B'. Accordingly, the driver of the host vehicle does not have to manually change the host vehicle velocity or disable or override the ACC. He/she may only steer the host vehicle H into the gap behind vehicle B'. Since the ACC can stay activated or enable during the entire process, driver comfort is increased.

A target selection of vehicle B' can be aborted or dropped by a further jerk of the steering wheel in a direction contrary to the first jerk. In FIG. 2 such a "target drop jerk" would be initiated by a steering wheel actuation in a counter-clockwise direction.

Figure 3:
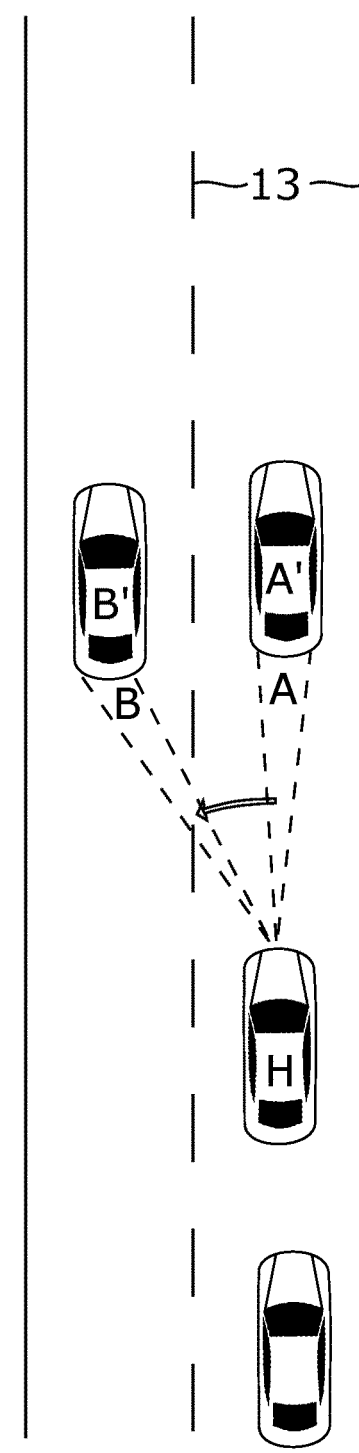
FIG. 3 illustrates a vehicle and an adaptive cruise control system according to yet some embodiments in a traffic scenario.

FIG. 3 illustrates a further scenario where the host vehicle H is driven on a road with road lanes 13. The host vehicle H comprises an ACC according to embodiments herein. The ACC is keeping a velocity which is selected by the host vehicle driver or is set to adjust the host vehicle velocity after the preceding vehicle A'. The host vehicle H is driven in the right lane and in the left lane a vehicle B' is overtaking the host vehicle H. If the driver of the host vehicle would like to increase the host vehicle velocity he/she may jerk the steering wheel counter-clockwise. Such a "target selection jerk" may be at least a pre-determined number of degrees and may have a pre-determined maximum duration.

Such a jerk will activate a switch of the target for the ACC, i.e. the object which the ACC is set to adjust the host vehicle velocity in relation to. In FIG. 3 the target switch is indicated by the change from target A to target B, i.e. from vehicle A' to vehicle B'. In the embodiment illustrated in FIG. 3 the velocity of the host vehicle H will be increased and adapted after the velocity of overtaking vehicle B'. Accordingly, the driver of the host vehicle does not have to manually change the host vehicle velocity or disable or override the ACC. Since the ACC can stay activated or enable during the entire process, driver comfort is increased.

In any embodiments herein the steering system 17 may be configured to identify a steering wheel jerk, performed as a clockwise- and counter-clockwise actuation of the steering wheel 19 within a predetermined time range, by comparing data from the steering angle sensor 18 with at least one predetermined threshold, and to select a next one of the moving or stationary objects A', B' in the surroundings in front of said vehicle H to control the speed of said vehicle H in relation to, based on the identified jerk as indicated by the steering angle sensor 18. A duration of the predetermined time range can be less than 2 seconds, preferably less than 1 second. A first predetermined threshold can be identifiable by a first clockwise or counter-clockwise steering angle of at least a degrees, a being at least 1 degree. A second predetermined threshold can be identifiable by a second steering angle of at least β degrees, β being at least 1 degree. The direction of the second steering angle can be opposite the first steering angle.

In some embodiments, as illustrated in FIG. 1, the ACC comprises or is connected to turn signal indicators 16. Initiation of a lane change can be confirmed via activation of a turn signal indicator 16. In some embodiments the ACC comprises a steering wheel arrangement 20 for vibrating the steering wheel and can be arranged to confirm initiation of a lane change through activating the steering wheel vibrating arrangement 20 to provide haptic confirmation to a vehicle operator.

A target selection of vehicle B' can be aborted or dropped by a further jerk of the steering wheel in a direction contrary to the first jerk. In FIG. 3 such a "target drop jerk" would be initiated by a steering wheel actuation in a clockwise direction.

The invention claimed is:

1. An adaptive cruise control system for controlling speed of a vehicle in relation to moving or stationary objects by accelerating or retarding the vehicle, the adaptive cruise control system comprising:
   a vehicle throttle controller;
   a vehicle braking system controller;
   at least one sensor, wherein the at least one sensor detects the moving or stationary objects in surroundings in front of the vehicle;
   a processor configured to control a speed of the vehicle in relation to a selected one of the detected moving or stationary objects by controlling one or both of the vehicle throttle controller or the vehicle braking system controller;
   a steering system with a steering wheel arranged to allow a provision of manual steering input to the steering system of the vehicle; and
   a steering angle sensor, wherein the steering system is configured to identify a specific momentary manual steering wheel actuation for target object selection and a direction of the specific momentary manual steering wheel actuation, differentiable from a steering wheel actuation for change of vehicle driving directions, by comparing data from the steering angle sensor with one or more predetermined thresholds, and to select a next one of the moving or stationary objects in the surroundings in front of the vehicle, and laterally to a same side of the vehicle as indicated by the direction of the specific momentary manual steering wheel actuation, to control the speed of the vehicle in relation to, based on the direction of the specific momentary manual steering wheel actuation indicated by the steering angle sensor, wherein the selection of the next one occurs before any lane change maneuver, and a lane change to a lane of the next one is not possible at the time of the selection of the next one.

2. The adaptive cruise control system according to claim 1, wherein as a default, the selected one of the detected moving or stationary objects in the surroundings essentially right in front of the vehicle is used to control the speed of the vehicle in relation to and a laterally next one of the moving or stationary objects in the surroundings in front of the vehicle is selectable by the specific momentary manual steering wheel actuation.

3. The adaptive cruise control system according to claim 1, wherein the specific momentary manual steering wheel actuation is identifiable by the predetermined threshold of a steering angle of at least a degrees, and wherein a is equal to at least 1.

4. The adaptive cruise control system according to claim 1, wherein the specific momentary manual steering wheel actuation is identifiable by the predetermined threshold of a change in steering angle of at least 10 degrees/second.

5. The adaptive cruise control system according to claim 1, wherein the specific momentary manual steering wheel actuation is identifiable by the predetermined threshold of a rate of change in steering angle of at least 50 degrees/s$^2$.

6. The adaptive cruise control system according to claim 1, wherein the specific momentary manual steering wheel actuation is identifiable by two different predetermined thresholds.

7. The adaptive cruise control system according to claim 1, further comprising:
   a display, wherein the display displays a representation of the selected one of the detected moving or stationary objects; and
   an input device, wherein the input device allows input of a confirmation of the displayed representation of the selected one of the detected moving or stationary objects being an object intended to be selected.

8. A vehicle comprising an adaptive cruise control system for controlling speed of the vehicle in relation to moving or stationary objects by accelerating or retarding the vehicle, the adaptive cruise control system comprising:
- a vehicle throttle controller;
- a vehicle braking system controller;
- at least one sensor, wherein the at least one sensor detects the moving or stationary objects in surroundings in front of the vehicle;
- a processor configured to control a speed of the vehicle in relation to a selected one of the detected moving or stationary objects by controlling one or both of the vehicle throttle controller or the vehicle braking system controller;
- a steering system with a steering wheel arranged to allow a provision of manual steering input to the steering system of the vehicle; and
- a steering angle sensor, wherein the steering system is configured to identify a specific momentary manual steering wheel actuation for target object selection and a direction of the specific momentary manual steering wheel actuation, differentiable from a steering wheel actuation for change of vehicle driving directions, by comparing data from the steering angle sensor with one or more predetermined thresholds, and to select a next one of the moving or stationary objects in the surroundings in front of the vehicle, and laterally to a same side of the vehicle as indicated by the direction of the specific momentary manual steering wheel actuation, to control the speed of the vehicle in relation to, based on the direction of the specific momentary manual steering wheel actuation indicated by the steering angle sensor, wherein the selection of the next one occurs before any lane change maneuver, and a lane change to a lane of the next one is not possible at the time of the selection of the next one.

9. The vehicle according to claim 8, wherein as a default, the selected one of the detected moving or stationary objects in the surroundings essentially right in front of the vehicle is used to control the speed of the vehicle in relation to and a laterally next one of the moving or stationary objects in the surroundings in front of the vehicle is selectable by the specific momentary manual steering wheel actuation.

10. The vehicle according to claim 8, wherein the specific momentary manual steering wheel actuation is identifiable by the predetermined threshold of a steering angle of at least a degrees, and wherein a is equal to at least 1.

11. The vehicle according to claim 8, wherein the specific momentary manual steering wheel actuation is identifiable by the predetermined threshold of a change in steering angle of at least 10 degrees/second.

12. The vehicle according to claim 8, wherein the specific momentary manual steering wheel actuation is identifiable by the predetermined threshold of a rate of change in steering angle of at least 50 degrees/s$^2$.

13. The vehicle according to claim 8, wherein the specific momentary manual steering wheel actuation is identifiable by two different predetermined thresholds.

14. The vehicle according to claim 8, further comprising:
- a display, wherein the display displays a representation of the selected one of the detected moving or stationary objects; and
- an input device, wherein the input device allows input of a confirmation of the displayed representation of the selected one of the detected moving or stationary objects being an object intended to be selected.

15. The vehicle according to claim 8, wherein the at least one sensor includes at least one of a camera sensor, a radar sensor, or a lidar sensor.

* * * * *

UNITED STATES PATENT AND TRADEMARK OFFICE
CERTIFICATE OF CORRECTION

PATENT NO. : 10,435,022 B2
APPLICATION NO. : 15/499311
DATED : October 8, 2019
INVENTOR(S) : Magnus Brandin Page 1 of 1

It is certified that error appears in the above-identified patent and that said Letters Patent is hereby corrected as shown below:

In the Claims

In Claim 3, Column 8, Line 43 should read "steering angle of at least α degrees, and wherein α is equal"
In Claim 10, Column 10, Line 11 should read "α degrees, and wherein α is equal to at least 1."

Signed and Sealed this
Seventh Day of January, 2020

Andrei Iancu
*Director of the United States Patent and Trademark Office*